(12) United States Patent
Kido et al.

(10) Patent No.: US 10,598,120 B2
(45) Date of Patent: Mar. 24, 2020

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventors: Eiichiro Kido, Okazaki (JP); Masanao Idogawa, Toyota (JP); Manami Yasunaga, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/178,000

(22) Filed: Nov. 1, 2018

(65) Prior Publication Data

US 2019/0145343 A1    May 16, 2019

(30) Foreign Application Priority Data

Nov. 15, 2017   (JP) .................................. 2017-220196

(51) Int. Cl.
| | |
|---|---|
| *F02D 41/40* | (2006.01) |
| *F02D 41/00* | (2006.01) |
| *F02D 41/14* | (2006.01) |
| *F02D 41/38* | (2006.01) |

(52) U.S. Cl.
CPC ......... *F02D 41/402* (2013.01); *F02D 41/008* (2013.01); *F02D 41/1454* (2013.01); *F02D 41/1482* (2013.01); *F02D 41/1483* (2013.01); *F02D 41/1408* (2013.01); *F02D 2041/389* (2013.01)

(58) Field of Classification Search
CPC ...... F02D 41/40; F02D 41/402; F02D 41/008; F02D 41/1454; F02D 41/1482; F02D 41/1483; F02D 41/1408; F02D 2041/389
See application file for complete search history.

(56) References Cited

U.S. PATENT DOCUMENTS

| | | | |
|---|---|---|---|
| 2016/0265467 A1 | 9/2016 | Hokuto et al. | |
| 2019/0024596 A1* | 1/2019 | Nose | .................... F02D 41/1408 |
| 2019/0128198 A1* | 5/2019 | Ban | ......................... F01N 3/101 |

FOREIGN PATENT DOCUMENTS

| | | |
|---|---|---|
| JP | 2013-234673 | 11/2013 |
| JP | 2016-169665 | 9/2016 |

* cited by examiner

*Primary Examiner* — Hieu T Vo
(74) *Attorney, Agent, or Firm* — Finnegan, Henderson, Farabow, Garrett & Dunner, LLP (57) ABSTRACT

A controller for an internal combustion engine includes processing circuitry. The processing circuitry performs a dither control process and a multi-injection process. Multiple injections in the multi-injection process includes a first injection and a second injection performed at a timing retarded from the first injection. The dither control process includes at least one of a process performed on a cylinder changed to a lean combustion cylinder so that a reduction amount of fuel injected through the first injection is greater than a reduction amount of fuel injected through the second injection and a process performed on a cylinder changed to a rich combustion cylinder so that an increase amount of fuel injected through the first injection is greater than an increase amount of fuel injected through the second injection.

5 Claims, 5 Drawing Sheets

Q1+Q2+Q3=Qd
Qd·K1=Q1, Qd·K2=Q2, Qd·K3=Q3

CONTROLLER FOR INTERNAL COMBUSTION ENGINE AND METHOD FOR CONTROLLING INTERNAL COMBUSTION ENGINE

BACKGROUND

The present invention relates to a controller for an internal combustion engine and a method for controlling an internal combustion engine.

For example, Japanese Laid-Open Patent Publication No. 2016-169665 describes a controller that executes dither control in which when a temperature increase request is made to increase the temperature of an exhaust gas purification catalyst (exhaust gas purification device), some cylinders are selected to be a rich combustion cylinder, the air-fuel ratio of which is richer than a stoichiometric air-fuel ratio, and the remaining cylinders are selected to be a lean combustion cylinder, the air-fuel ratio of which is leaner than the stoichiometric air-fuel ratio.

Japanese Laid-Open Patent Publication No. 2013-234673 describes a controller that performs a multi-injection process (divided injection process) in which fuel is supplied to each cylinder through multiple injections in one combustion cycle.

SUMMARY

When dither control is executed during the multi-injection process, the amount of fuel injected at a time varies from the amount of fuel injected at the corresponding time when dither control is not executed during the multi-injection process. Specifically, the amount of fuel injected into a rich combustion cylinder through each of the multiple injections is corrected to be increased at the same correction rate. The amount of fuel injected into a lean combustion cylinder through each of the multiple injections is corrected to be reduced at the same correction rate. As a result, in a period during which the fuel is not easily atomized, the amount of fuel injected may be excessively increased or reduced. This may adversely affect the combustion state.

Multiple aspects of the present invention to solve the above problems and operational effects thereof are described below.

Aspect 1. In a controller for an internal combustion engine, the internal combustion engine includes an exhaust gas purification device configured to purify exhaust discharged from a plurality of cylinders and a plurality of fuel injection valves respectively provided for the cylinders. The controller includes processing circuitry. The processing circuitry is configured to perform a dither control process that operates the fuel injection valves so as to set one or more of the cylinders as a rich combustion cylinder having an air-fuel ratio richer than a stoichiometric air-fuel ratio and another one or more of the cylinders as a lean combustion cylinder having an air-fuel ratio leaner than the stoichiometric air-fuel ratio and a multi-injection process that controls the fuel injection valves so as to allow each of the fuel injection valves to inject fuel multiple times in a combustion cycle of a corresponding one of the cylinders. Multiple injections in the multi-injection process include at least a first injection and a second injection performed at a timing retarded from the first injection. The dither control process includes a process that changes the cylinders that are set as the rich combustion cylinder and the lean combustion cylinder. The dither control process performed during the multi-injection process includes at least one of a process performed on the cylinder changed from the rich combustion cylinder to the lean combustion cylinder so that a reduction amount of fuel injected through the first injection is greater than a reduction amount of fuel injected through the second injection and a process performed on the cylinder changed from the lean combustion cylinder to the rich combustion cylinder so that an increase amount of fuel injected through the first injection is greater than an increase amount of fuel injected through the second injection.

The second injection at a retarded timing tends to be performed at a timing closer to an ignition timing than the first injection at an advanced timing. The time to atomize fuel injected at the timing closer to the injection timing is short. Thus, the amount of fuel injected at the timing closer to the injection timing tends to largely affect the combustion state. If the fuel injection amount in the second injection is largely corrected due to the dither control process, the combustion state is easily affected. In this regard, in the configuration described above, the reduction amount or the increase amount of the fuel injection is set so that dither control corrects the injection amount by increasing or reducing the fuel injection amount in mainly the first injection. This limits the adverse effect on the combustion state.

Aspect 2. In the controller according to aspect 1, the processing circuitry is configured to perform a requested injection amount calculation process that calculates a requested injection amount based on an amount of air filling a combustion chamber. The dither control process includes a process that performs increase correction on the requested injection amount using an increase correction rate to calculate an injection amount of the rich combustion cylinder and performs reduction correction on the requested injection amount using a reduction correction rate to calculate an injection amount of the lean combustion cylinder and a process that sets one or more of the cylinders to the rich combustion cylinder and another one or more of the cylinders to the lean combustion cylinder in a first period. The first period is included in a second period. A total increase correction rate is a value obtained by adding up a value of the increase correction rate used for calculating the injection amount of the rich combustion cylinder in the second period a number of times that the increase correction rate is used in the second period. A total reduction correction rate is a value obtained by adding up a value of the reduction correction rate used for calculating the injection amount of the lean combustion cylinder in the second period a number of times that the reduction correction rate is used in the second period. The dither control process further includes a process that sets the increase correction rate and the reduction correction rate so that the total increase correction rate is equal to the total reduction correction rate.

In the configuration described above, the dither control process includes the process setting the increase correction rate and the reduction correction rate so that the total increase correction rate is equal to the total reduction correction rate. If the requested injection amount is fixed, the amount of fuel injected will be the same as when the requested injection amount of fuel is injected into all of the cylinders during the second period. Hence, if the requested injection amount is fixed, the total amount of fuel injected in the second period is equal to that when the dither control is not performed.

Aspect 3. In the controller according to aspect 1 or 2, the processing circuitry is configured to perform a requested injection amount calculation process that calculates a requested injection amount based on an amount of air filling a combustion chamber. The multi-injection process is a process that divides the requested injection amount to supply the requested injection amount of fuel to each cylinder through multiple injections. The requested injection amount is divided into at least a first requested injection amount for the first injection and a second requested injection amount for the second injection. The dither control process performed during the multi-injection process includes a process that performs increase correction on the first and second requested injection amounts using an increase correction rate to calculate an injection amount of the rich combustion cylinder, a process that performs reduction correction on the first and second requested injection amounts using a reduction correction rate to calculate an injection amount of the lean combustion cylinder, a process that sets an increase correction rate applied to the second requested injection amount to be smaller than an increase correction rate applied to the first requested injection amount for the rich combustion cylinder, and a process that sets a reduction correction rate applied to the second requested injection amount to be smaller than a reduction correction rate applied to the first requested injection amount for the lean combustion cylinder.

Aspect 4. In the controller according to aspect 3, the dither control process includes a process that sets the increase correction rate applied to the second requested injection amount for the rich combustion cylinder and the reduction correction rate applied to the second requested injection amount for the lean combustion cylinder to zero on condition that the multi-injection process performs the first injection on an intake stroke and the second injection on a compression stroke.

The time to atomize the fuel injected on the compression stroke is shorter than the time to atomize the fuel injected on the intake stroke. Thus, the amount of fuel injected on the compression stroke tends to largely affect the combustion state. In this regard, in the configuration described above, the increase correction rate for the rich combustion cylinder and the reduction correction rate for the lean combustion cylinder are set to zero in the fuel injection on the compression stroke. This limits the adverse effect on the combustion state caused by dither control.

Aspect 5. In a method for controlling an internal combustion engine, the internal combustion engine includes an exhaust gas purification device configured to purify exhaust discharged from a plurality of cylinders and a plurality of fuel injection valves respectively provided for the cylinders. The method includes performing a dither control process that operates the fuel injection valves so as to set one or more of the cylinders as a rich combustion cylinder having an air-fuel ratio richer than a stoichiometric air-fuel ratio and another one or more of the cylinders as a lean combustion cylinder having an air-fuel ratio leaner than the stoichiometric air-fuel ratio and performing a multi-injection process that controls the fuel injection valves so as to allow each of the fuel injection valves to inject fuel multiple times in a combustion cycle of a corresponding one of the cylinders. Multiple injections in the multi-injection process include at least a first injection and a second injection performed at a timing retarded from the first injection. The dither control process includes a process that changes the cylinders that are set as the rich combustion cylinder and the lean combustion cylinder. The dither control process performed during the multi-injection process includes at least one of a process performed on the cylinder changed from the rich combustion cylinder to the lean combustion cylinder so that a reduction amount of fuel injected through the first injection is greater than a reduction amount of fuel injected through the second injection and a process performed on the cylinder changed from the lean combustion cylinder to the rich combustion cylinder so that an increase amount of fuel injected through the first injection is greater than an increase amount of fuel injected through the second injection.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

One embodiment of a controller for an internal combustion engine is described below with reference to the drawings.

Figure 1:
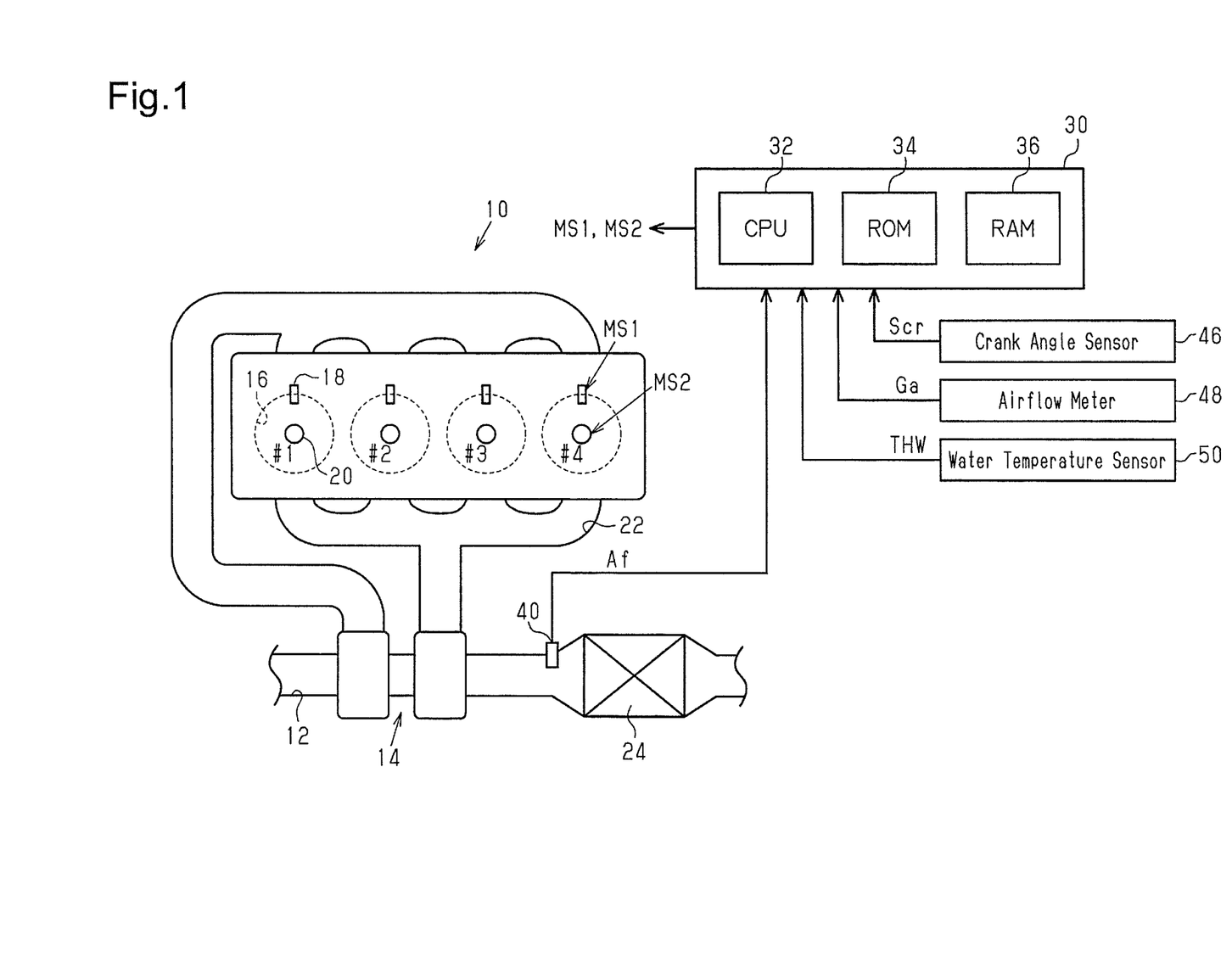
FIG. 1 shows one embodiment of an internal combustion engine and a controller for the internal combustion engine.

In an internal combustion engine 10 shown in FIG. 1, air drawn from an intake passage 12 flows through a turbocharger 14 into a combustion chamber 16 of each of cylinders #1 to #4. Each of the cylinders #1 to #4 includes a fuel injection valve 18 that injects fuel and an ignition device 20 that generates spark discharge. In the combustion chamber 16, a mixture of air and fuel is used for combustion, and the air-fuel mixture used for combustion is discharged as exhaust to an exhaust passage 22. A three-way catalyst 24 capable of storing oxygen is disposed in the exhaust passage 22 at the downstream side of the turbocharger 14.

A controller 30 operates operation units in the internal combustion engine 10 such as the fuel injection valves 18 and the ignition devices 20 to control the internal combustion engine 10 and amounts of characteristics related to the internal combustion engine 10 (a torque, an exhaust component, etc.). In this case, the controller 30 refers to an air-fuel ratio Af detected by an air-fuel ratio sensor 40 located at the upstream side of the three-way catalyst 24, an output signal Scr of a crank angle sensor 46, an intake air amount Ga detected by an airflow meter 48, and a temperature of cooling water (a water temperature THW) of the internal combustion engine 10 detected by a water temperature sensor 50. The controller 30 includes a CPU 32, a ROM 34, and a RAM 36. As the CPU 32 performs programs stored in the ROM 34, the amounts of characteristics related to the internal combustion engine 10 are controlled.

Figure 2:
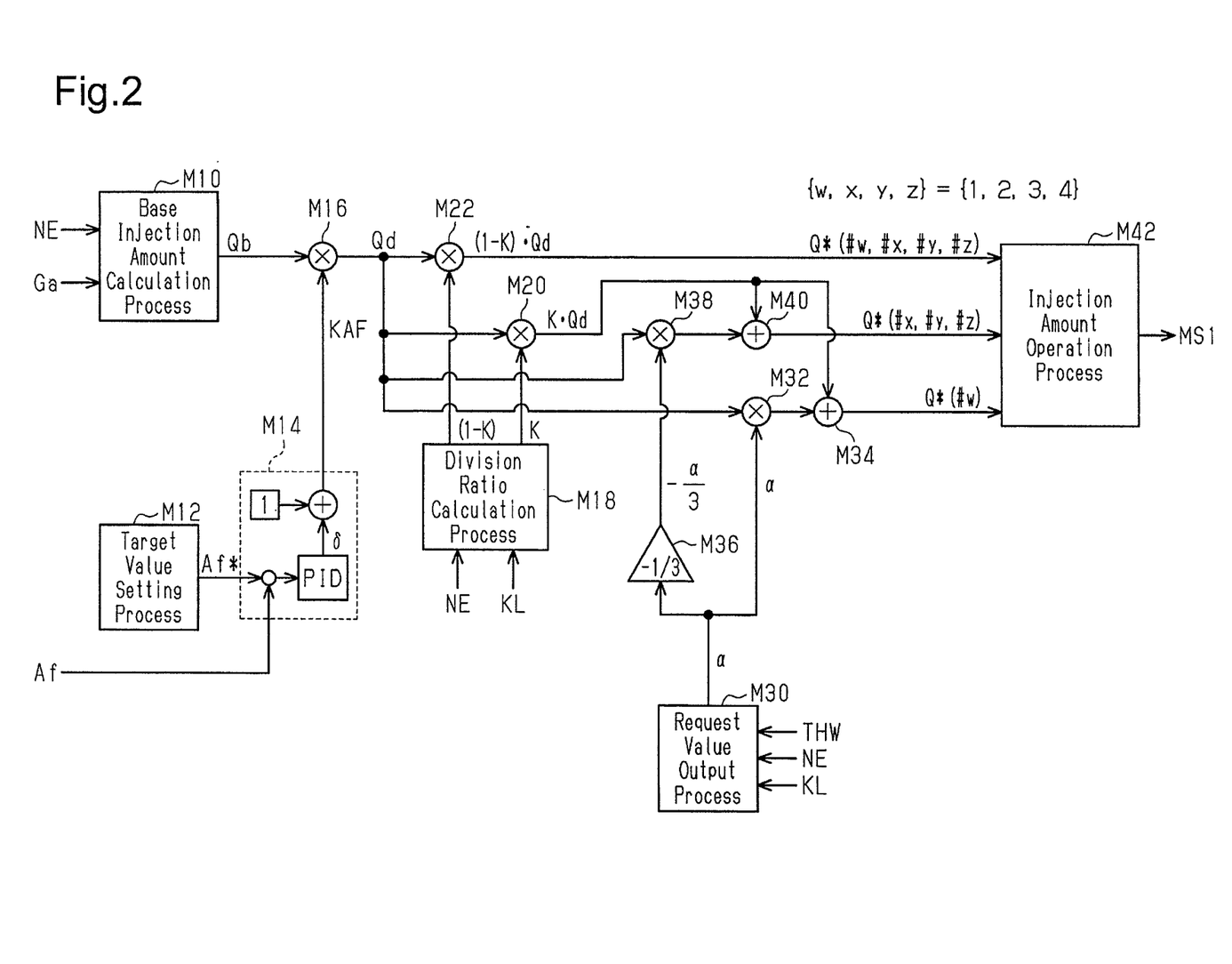
FIG. 2 is a block diagram showing some of the processes performed by the controller shown in FIG. 1.

FIG. 2 shows some of the processes implemented by the CPU 32 performing the programs stored in the ROM 34.

A base injection amount calculation process M10 is a process calculating a base injection amount Qb as an open loop operation amount, which is an operation amount for adjusting the air-fuel ratio of an air-fuel mixture in the combustion chamber 16 to a target air-fuel ratio through open-loop control, based on a rotational speed NE calculated based on the output signal Scr of the crank angle sensor 46 and the intake air amount Ga.

A target value setting process M12 is a process setting a target value Af* of a feedback control amount for controlling the air-fuel ratio of an air-fuel mixture in the combustion chamber 16 to the target air-fuel ratio.

A feedback process M14 is a process calculating a feedback operation amount KAF, which is an operation amount for adjusting the air-fuel ratio Af acting as the feedback control amount to the target value Af* through feedback control. In the present embodiment, the difference between the target value Af* and the air-fuel ratio Af is input to a proportional element, an integral element, and a differential element. Output values of the proportional element, the integral element, and the differential element are summed up to calculate a correction rate δ of the base injection amount Qb. The feedback operation amount KAF is "1+δ."

A base injection amount correction process M16 is a process correcting the base injection amount Qb by multiplying the base injection amount Qb and the feedback operation amount KAF to calculate a requested injection amount Qd.

A division ratio calculation process M18 is a process calculating a division ratio K of the requested injection amount Qd based on an operating point of the internal combustion engine 10 determined based on the rotational speed NE and a load factor KL. The division ratio K is greater than zero and is less than or equal to one. When the division ratio K is one, the requested injection amount Qd of fuel is injected from the fuel injection valve 18 through a single fuel injection. When the division ratio K is less than one, the requested injection amount Qd of fuel is injected from the fuel injection valve 18 through two fuel injections so that the multi-injection process is performed.

Specifically, the ROM 34 stores map data that includes the rotational speed NE and the load factor KL as input variables and the division ratio K as output variables, and the CPU 32 obtains the division ratio K through map calculation. The map data is data sets of discrete values of the input variables and values of the output variables corresponding to the values of the input variables. In the map calculation, for example, when the value of an input variable matches any of the values of the input variables in the map data, the value of the corresponding output variable in the map data is output as a calculation result. When the value of the input variable does not match any of the values of the input variables in the map data, a value may be obtained by interpolating multiple values of the output variables included in the map data and be output as a calculation result. The load factor KL is a parameter indicating the load of the internal combustion engine 10. Specifically, the load factor KL is a parameter for quantifying the amount of air filling the combustion chamber 16 of the internal combustion engine 10 and is the ratio of the amount of inflow air in one cylinder per combustion cycle to a reference inflow air amount. The reference inflow air amount may be variably set based on the rotational speed NE.

The two injections in the multi-injection process include an advanced injection, or a first injection, and a retarded injection, or a second injection, performed at a timing retarded from the first injection.

An advanced injection amount calculation process M20 is a process multiplying the requested injection amount Qd by the division ratio K to calculate an advanced injection amount. A retarded injection amount calculation process M22 is a process multiplying the requested injection amount Qd by "1−K" to calculate a retarded injection amount. When the division ratio K is one, the retarded injection amount is zero.

Figure 3A:
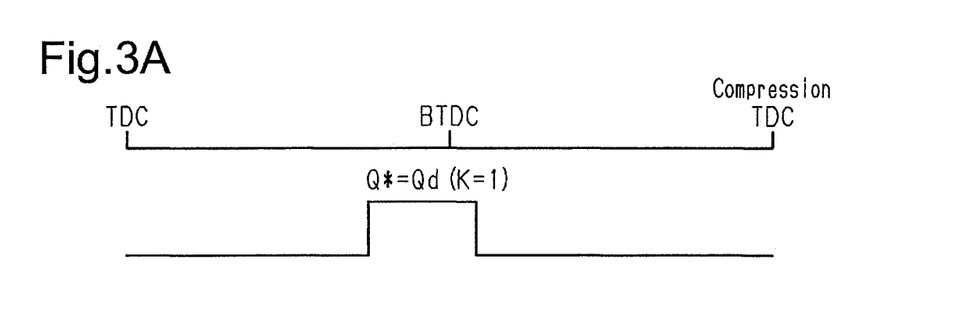
FIGS. 3A and 3B are time charts showing injection patterns based on division ratios.
Figure 3B:
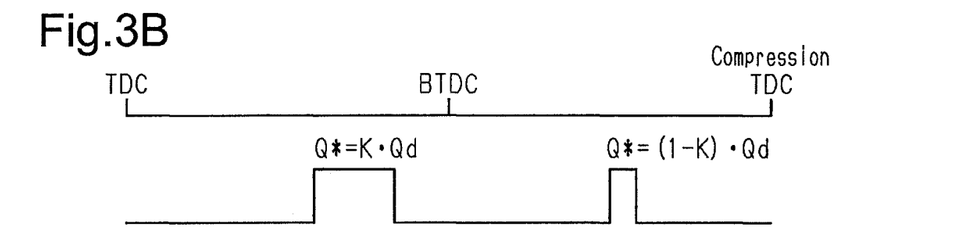

FIG. 3A shows an injection mode when the division ratio K is one (single injection). In this case, an injection amount command value Q* of the fuel injection valve 18 is the requested injection amount Qd. FIG. 3B shows an injection mode when the division ratio K is less than one (multi-injection). In this case, an advanced injection amount command value Q* is "K·Qd," and a retarded injection amount command value Q* is "(1−K)·Qd." The requested injection amount Qd is the sum of the advanced injection amount command value Q* and the retarded injection amount command value Q*. In the present embodiment, the division ratio K is set to be greater than ½ so that the advanced injection amount is greater than the retarded injection amount. One reason for such setting is that the period from when the retarded injection is performed to an ignition timing is short. Thus, it may be more difficult to sufficiently atomize fuel of the retarded injection before the ignition timing than to sufficiently atomize fuel of the advanced injection before the ignition timing.

Referring again to FIG. 2, a request value output process M30 is a process calculating and outputting an injection amount correction request value α, which is an injection amount correction value requested by dither control setting the cylinders to have different air-fuel ratios of an air-fuel mixture used for combustion. At this time, the fuel injection amount of each cylinder is set such that components of the entire exhaust discharged from the cylinders #1 to #4 of the internal combustion engine 10 are equivalent to those when the air-fuel ratio of the air-fuel mixture in each of the cylinders #1 to #4 used for combustion is the target air-fuel ratio. The description "the fuel injection amount of each cylinder is set such that components of the entire exhaust discharged from the cylinders #1 to #4 of the internal combustion engine 10 are equivalent to those when the air-fuel ratio of the air-fuel mixture in each of the cylinders #1 to #4 used for combustion is the target air-fuel ratio" refers to the fuel injection amount being set such that the entire exhaust discharged from the cylinders #1 to #4 contains unburned fuel components and oxygen that react with each other without any excess or deficiency. In the dither control of the present embodiment, one of the first cylinder #1 to the fourth cylinder #4 is set as a rich combustion cylinder in which the air-fuel ratio of the air-fuel mixture is richer than the stoichiometric air-fuel ratio, and the remaining three cylinders are set as a lean combustion cylinder in which the air-fuel ratio of the air-fuel mixture is leaner than the stoichiometric air-fuel ratio. The injection amount of the rich combustion cylinder in a combustion cycle is set to be "1+α" times greater than the requested injection amount Qd. The injection amount of the lean combustion cylinder in a combustion cycle is set to be "1−(α/3)" times greater than the requested injection amount Qd. With the setting of the injection amounts of the lean combustion cylinder and the rich combustion cylinder, if the cylinders #1 to #4 of the internal combustion engine 10 are filled with the same amount of air, components of the entire exhaust discharged from the cylinders #1 to #4 are equivalent to those when the air-fuel ratio of the air-fuel mixture in each of the cylinders #1 to #4 used for combustion is the target air-fuel ratio.

When a request for warming up the three-way catalyst 24 is made, the request value output process M30 sets the injection amount correction request value α to a value greater than zero. It is assumed that the warm-up request of the three-way catalyst 24 is made when conditions (A) and (B) are both true. Condition (A) is that an added-up value InGa calculated by adding up the intake air amount Ga from a start-up of the internal combustion engine 10 is greater than or equal to a first specified value Inth1. Condition (B)

is that the added-up value InGa is less than or equal to a second specified value Inth and the water temperature THW is lower than or equal to a predetermined temperature THWth. If condition (A) is true, it is determined that the temperature of an upstream end of the three-way catalyst 24 is an activated temperature. If condition (B) is true, it is determined that the three-way catalyst 24 is not entirely in an active state. The request value output process M30 variably sets the injection amount correction request value $\alpha$ based on the operating point of the internal combustion engine 10 determined based on the rotational speed NE and a load factor KL. This is achieved by storing map data that includes the rotational speed NE and the load factor KL as input variables and the injection amount correction request value $\alpha$ as output variables in the ROM 34 and causing the CPU 32 to obtain the injection amount correction request value $\alpha$ through map calculation.

A dither correction amount calculation process M32 is a process multiplying the requested injection amount Qd by the injection amount correction request value $\alpha$ to calculate an injection amount correction amount "Qd·$\alpha$" of a rich combustion cylinder #w where "w" represents "1," "2," "3," or "4." A dither correction process M34 is a process adding the output value of the dither correction amount calculation process M32 to the output value of the advanced injection amount calculation process M20 to calculate an injection amount command value Q*(#w) in an advanced injection of a rich combustion cylinder. When the multi-injection process is not performed, the injection amount command value Q* output by the dither correction process M34 is an injection amount command value Q* in a single fuel injection.

A multiplication process M36 is a process multiplying the injection amount correction request value $\alpha$ by "−1/3." A dither correction amount calculation process M38 is a process multiplying the requested injection amount Qd by the output value of the multiplication process M36 to calculate an injection amount correction amount "Qd·(−$\alpha$/3)" of lean combustion cylinders #x, #y, and #z where "x," "y," and "z" represent "1," "2," "3," or "4" and "w," "x," "y," and "z" are different from each other. A dither correction process M40 is a process adding the output value of the dither correction amount calculation process M38 to the output value of the advanced injection amount calculation process M20 to calculate an injection amount command value Q*(#x, #y, #z) in an advanced injection of lean combustion cylinders. When the multi-injection process is not performed, the injection amount command value Q* output by the dither correction process M40 is the injection amount command value Q* in a single fuel injection.

Figure 4:
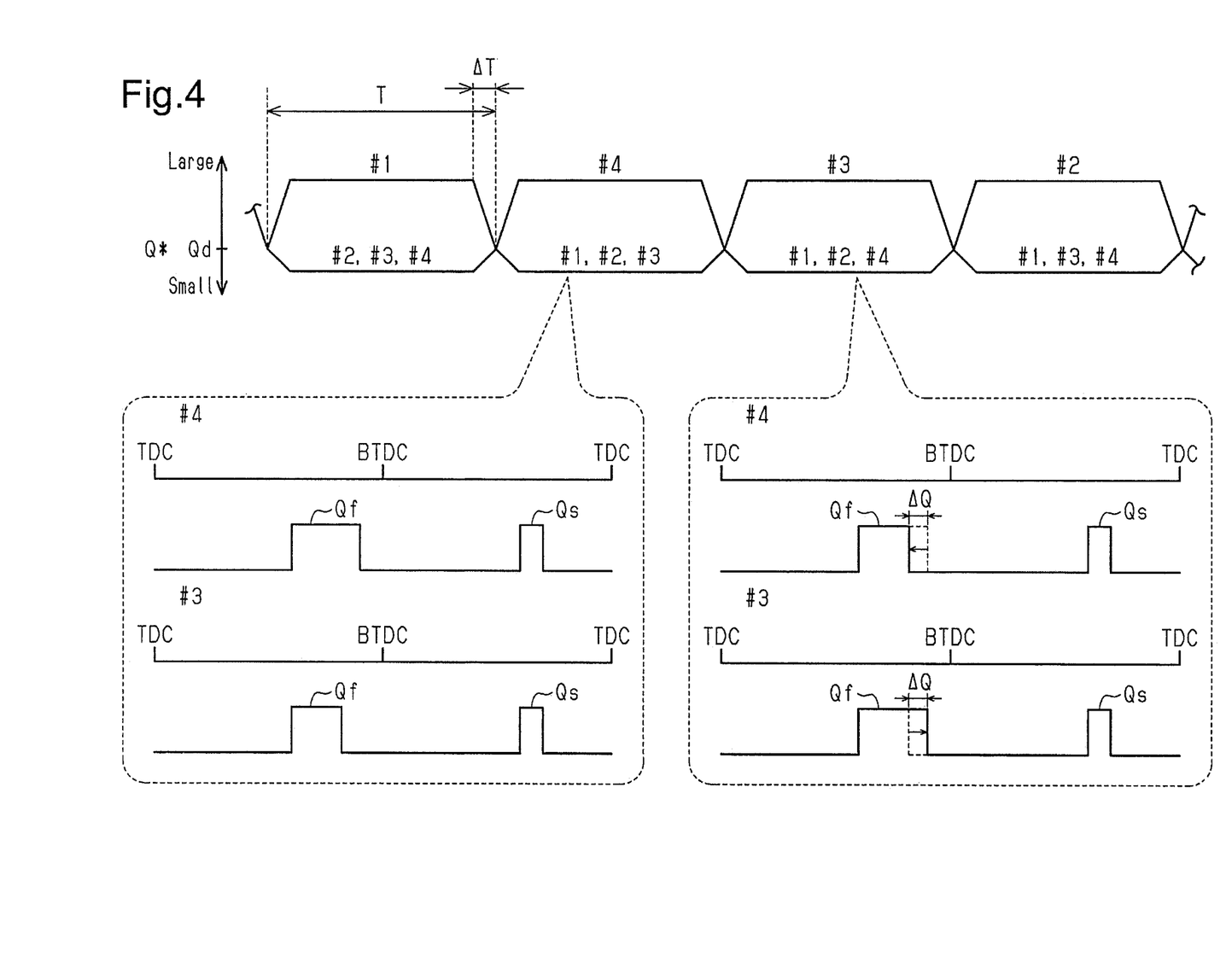
FIG. 4 is a time chart showing changes in the fuel injection amount set by the controller shown in FIG. 1.

As shown in the upper part of FIG. 4, in the present embodiment, the cylinder set to the rich combustion cylinder #w is switched among the cylinders #1 to #4 in each period T. More specifically, as shown in the upper part of FIG. 4, the rich combustion cylinder is set to the cylinder #1, the cylinder #4, the cylinder #3, and the cylinder #2 in this order. If a certain cylinder is fixed as the rich combustion cylinder, unburned fuel may flow into and concentrate on a portion of the three-way catalyst 24. The switching of the rich combustion cylinder avoids such a problem. A period $\Delta T$ between switching operations corresponds to the period for gradually changing the injection amount correction request value $\alpha$.

When the injection amount correction request value $\alpha$ is zero, the injection amount command value Q* output by the dither correction process M34 is equal to the injection amount command value Q* output by M40. Thus, the rich combustion cylinder is not distinguished from the lean combustion cylinder. FIGS. 3A and 3B show time charts of injections performed based on the injection amount command value Q* when the injection amount correction request value $\alpha$ is zero.

Referring again to FIG. 2, an injection amount operation process M42 is a process generating an operation signal MS1 for the fuel injection valve 18 of the rich combustion cylinder #w at the advanced injection timing and outputting the operation signal MS1 to the fuel injection valve 18 to operate the fuel injection valve 18 such that the amount of fuel injected from the fuel injection valve 18 corresponds to the injection amount command value Q* output by the dither correction process M34. The injection amount operation process M42 is also a process generating an operation signal MS1 for the fuel injection valve 18 of the lean combustion cylinder #x, #y, or #z at the advanced injection timing and outputting the operation signal MS1 to the fuel injection valve 18 to operate the fuel injection valve 18 such that the amount of fuel injected from the fuel injection valve 18 corresponds to the injection amount command value Q* output by the dither correction process M40. In addition, the injection amount operation process M42 is also a process generating a operation signal MS1 for the fuel injection valve 18 of each cylinder and outputting the operation signal MS1 to the fuel injection valve 18 at the retarded injection timing to operate the fuel injection valve 18 such that the amount of fuel injected from the fuel injection valve 18 corresponds to the output value of the retarded injection amount calculation process M22. When the division ratio K is one, the retarded injection timing is not present. That is, there is no operation of the fuel injection valve 18 at the retarded injection timing.

Operations and effects of the present embodiment are described below.

When multi-injection is performed, the CPU 32 sets the injection amount command value Q* in the advanced injection of a rich combustion cylinder to "(K+$\alpha$)·Qd" and the injection amount command value Q* in the advanced injection of a lean combustion cylinder to "{K−($\alpha$/3)}·Qd." The CPU 32 further sets the injection amount command value Q* in the retarded injection of each of the lean combustion cylinder and the rich combustion cylinder to "(1−K)·Qd." The increase correction rate of a divided requested injection amount "K·Qd" for the advanced injection of the rich combustion cylinder is "(K·Qd·$\alpha$)/(K·Qd)=$\alpha$." The reduction correction rate of a divided requested injection amount "K·Qd" for the advanced injection of the lean Combustion cylinder is "{K·Qd·($\alpha$/3)}/(K·Qd)=$\alpha$/3." The increase correction rate and the reduction correction rate of a divided requested injection amount "(1−K)·Qd" for the retarded injections of the rich combustion cylinder and the lean combustion cylinder are zero. In the present embodiment, the increase correction rate and the reduction correction rate of the divided requested injection amount for the retarded injections are smaller than those for the advanced injections.

A description will be given of a comparative example of the present embodiment in which advanced injection and retarded injection are corrected based on the injection amount correction request value $\alpha$ and the division ratio K. In this example, in a rich combustion cylinder, the injection amount command value Q* for advanced injection is "K·Qd·(1+$\alpha$)," and the injection amount command value Q* for retarded injection is "(1−K)·Qd·(1+$\alpha$)." In a lean combustion cylinder, the injection amount command value Q* for advanced injection is "K·Qd·{1−($\alpha$/3)}," and the injection amount command value Q* for retarded injection is "(1−K)

·Qd·{1−(α/3)}." In this comparative example, the injection amount command value Q* for the retarded injection is "(1−K)·Qd·(1+α)" in the rich combustion cylinder and "(1−K)·Qd·{1−(α/3)}" in the lean combustion cylinder. As shown in FIG. 3B, the timing of the retarded injection is close to the ignition timing and thus the atomization time is short. For this reason, when the injection amount command value Q* for the retarded injection of the rich combustion cylinder is set to "(1−K)·Qd·(1+α)," fuel is increased by an amount of "(1−K)·Qd·α" with respect to the injection amount when dither control is not executed. In this case, it is difficult to atomize the entire fuel and thus the fuel combustion performance easily deteriorates. When the injection amount command value Q* for the retarded injection of the lean combustion cylinder is set to "(1−K)·Qd·{1−(α/3)}," fuel is reduced by an amount of "(1−K)·Qd·(α/3)" with respect to the injection amount when the dither control is not executed. As shown in FIG. 3B, in the multi-injection, the amount of the retarded injection tends to be set to be less than that of the advanced injection. For this reason, when the injection amount command value Q* for the retarded injection of the lean combustion cylinder is reduced, the injection amount may be less than the minimum injection amount of fuel that can be injected by the fuel injection valve 18. In such a case, the controllability of the fuel injection amount is lowered.

In this regard, in the present embodiment, when two fuel injections, that is, the advanced injection and the retarded injection are performed as a multi-injection process, fuel correction requested by the dither control is performed by adjusting only the injection amount in the advanced injection. Thus, the problem that occurs in the comparative example may be avoided.

In the present embodiment, in a combustion cycle in which the air-fuel mixture is successively burned in four cylinders, fuel injection is performed in the rich combustion cylinder once. Thus, the increase correction rate "a" of the requested injection amount Qd is used once in a combustion cycle. A total increase correction rate is obtained by adding up a value of the increase correction rate a number of times that the increase correction rate is used for calculating the injection amount of the rich combustion cylinder in a combustion cycle. The total increase correction rate is "α." On the other hand, in a combustion cycle in which the air-fuel mixture is successively burned in four cylinders, fuel injection is performed in the lean combustion cylinders three times. Thus, the reduction correction rate "α/3" of the requested injection amount Qd is used three times in a combustion cycle. A total reduction correction rate is obtained by adding up a value of the reduction correction rate a number of times that the reduction correction rate is used for calculating the injection amount of the lean combustion cylinders in a combustion cycle. The total reduction correction rate is "3·(α/3)=α." The total increase correction rate is equal to the total reduction correction rate. When the requested injection amount Qd is fixed throughout a combustion cycle, the total injection amount in the combustion cycle is equal to that when the dither control is not executed. Thus, components of exhaust gas flowing into the three-way catalyst 24 in a combustion cycle are equivalent to those when the dither control is not executed.

In the present embodiment, as shown in the lower part of FIG. 4, the cylinder #4 is switched from the rich combustion cylinder to the lean combustion cylinder, and thus the advanced injection amount Qf is reduced by a predetermined amount ΔQ. However, when the requested injection amount Qd is fixed, the retarded injection amount Qs remains the same. When the requested injection amount Qd remains the same at the time of switching the cylinder #4 from the rich combustion cylinder to the lean combustion cylinder, the predetermined amount ΔQ is "Qd·(4α)/3."

In the present embodiment, as shown in the lower part of FIG. 4, the cylinder #3 is switched from the lean combustion cylinder to the rich combustion cylinder, and thus the advanced injection amount Qf is increased by the predetermined amount ΔQ. However, when the requested injection amount Qd is fixed, the retarded injection amount Qs remains the same.

Correspondences

Correspondences of matters described in the embodiment and matters described in "SUMMARY" are described below. The correspondences are described below for each number shown in "SUMMARY."

[1], [5] The exhaust gas purification device corresponds to the three-way catalyst 24. The dither control process corresponds to the multiplication process M36, the dither correction amount calculation process M38, the dither correction process M40, the dither correction amount calculation process M32, the dither correction process M34, and the injection amount operation process M42 when the injection amount correction request value α is greater than zero. The multi-injection process corresponds to the division ratio calculation process M18, the advanced injection amount calculation process M20, the retarded injection amount calculation process M22, and the injection amount operation process M42 when the division ratio K is less than one. Changes in rich combustion cylinder are shown in FIG. 4.

[2], [3] The requested injection amount calculation process corresponds to the base injection amount calculation process M10, the target value setting process M12, the feedback process M14, and the base injection amount correction process M16.

[4] The value "(1−K)·Qd" output by the retarded injection amount calculation process M22 corresponds to the injection amount command value Q* that is not corrected based on the injection amount correction request value α.

Other Embodiments

The present embodiment may be changed and implemented as described below. The present embodiment and the following modified examples may be implemented in combination as long as there is no technical contradiction.

Multi-Injection Process

Figure 5:
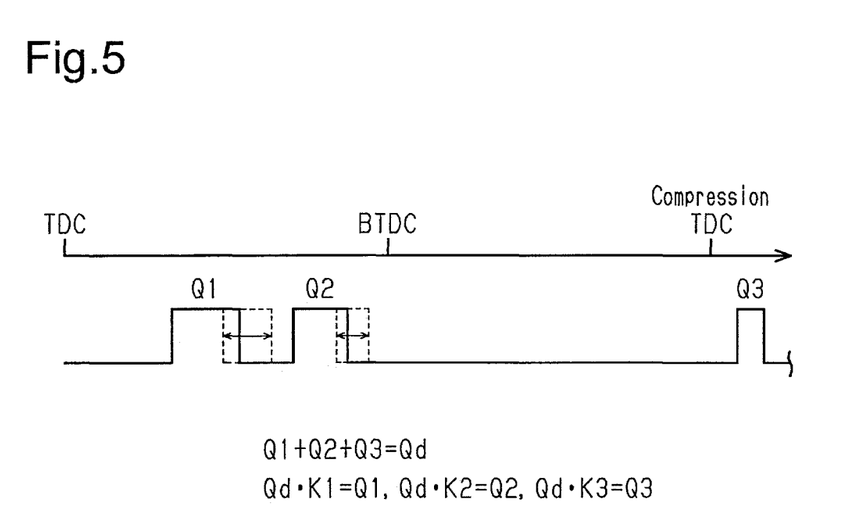
FIG. 5 is a time chart showing multi-injection according to a modified example.

In the present embodiment, the multi-injection process is the process performing fuel injection twice in a cylinder during a combustion cycle. However, embodiments are not limited to such a configuration. For example, as shown in FIG. 5, fuel injection may be performed three times in a cylinder during a combustion cycle. That is, fuel injection may be performed three or more times in a cylinder during a combustion cycle. As described below in the section titled "Others," when the internal combustion engine 10 includes a port injection valve as a fuel injection valve, fuel injection from the port injection valve may be performed twice in a cylinder during a combustion cycle. As described below in the section titled "Others," when the internal combustion engine 10 includes a port injection valve and direct injection valve, fuel injection from the port injection valve may be performed one or more times and fuel injection from the direct injection valve may be performed one or more times in a cylinder during a combustion cycle. Dither Control Process during Multi-Injection Process For example, as shown in FIG. 5, when fuel injection is performed three times in a cylinder during a combustion cycle, a first injection amount Q1, which is the amount of fuel injected at the most advanced timing, and a second injection amount Q2 may be corrected based on the injection amount correction request value $\alpha$. For example, such correction is achieved as follows. As shown in FIG. 5, the sum of the first injection amount Q1, the second injection amount Q2, and a third injection amount Q3 is the requested injection amount Qd. Each injection amount is calculated by multiplying the corresponding one of the division ratios K1, K2, and K3 (K1+K2+K3=1) and the requested injection amount Qd.

It is assumed that the division ratio of a correction amount in dither control is determined based on a coefficient $\beta$ ((1/2)<$\beta$<1). In this case, for a rich combustion cylinder, the first injection amount may be calculated by adding the injection amount Q1 to "Qd·$\alpha$·$\beta$," and the second injection amount may be calculated by adding the injection amount Q2 to "Qd·$\alpha$·(1−$\beta$)." For a lean combustion cylinder, the first injection amount may be calculated by subtracting "Qd·($\alpha$/3)·$\beta$" from the injection amount Q1, and the second injection amount may be calculated by subtracting "Qd·($\alpha$/3)·(1−$\beta$)" from the injection amount Q2.

In a process performing dither control on an injection subsequent to the injection at the most advanced timing to correct the injection amount, fuel injection does not necessarily have to be performed three or more times. For example, when fuel injection is performed twice as in the embodiment, increase correction may be performed on the injection amount of a retarded injection in a rich combustion cylinder and reduction correction may be performed on the injection amount of a retarded injection in a lean combustion cylinder.

In the embodiment, for example, the injection amount command value Q* of fuel injected at an advanced timing may be set to "K·(1+$\alpha$)·Qd" only in a rich combustion cylinder, and the injection amount command value Q* of fuel injected at a retarded timing may be changed to "(1−K)·(1+$\alpha$)·Qd." In this case, reduction correction is not performed on the injection amount of a retarded fuel injection in a lean combustion cylinder through dither control. This prevents the injection amount of a retarded fuel injection from being less than the minimum injection amount due to the dither control. In the embodiment, for example, the injection amount command value Q* of fuel injected at the advanced timing may be set to "K·{(1−($\alpha$/3)}·Qd" only in a lean combustion cylinder, and the injection amount command value Q* of fuel injected at the retarded timing may be changed to "(1−K)·{(1−($\alpha$/3)}·Qd." In this case, increase correction is not performed on the injection amount of a retarded injection in a rich combustion cylinder. Thus, an excessive amount of fuel will not be injected into the rich combustion cylinder by the retarded injection, which would hinder atomization of the fuel.

Injection Amount Calculating Timing

Although the number of times that the requested injection amount Qd is calculated in a cylinder during a combustion cycle is not particularly specified in the process shown in FIG. 2, the number of times is not limited to one. For example, when a multi-injection process is performed, the base injection amount Qb based on the latest amount of air filling a cylinder, which is determined based on the latest intake air amount Ga, the latest rotational speed NE, and other factors, may be calculated between when an advanced injection is started and when a retarded injection is started. Then, the requested injection amount Qd for retarded fuel injection may be calculated based on the base injection amount Qb. Additionally, when the multi-injection process is performed, the latest feedback operation amount. KAF may be calculated between when the advanced injection is started and when the retarded injection is started. Then, the requested injection amount Qd for retarded fuel injection may be calculated based on the latest feedback operation amount KAF. In such cases, although the requested injection amount Qd that is calculated at a single timing is not divided using the division ratio K for dividing the requested injection amount Qd, the requested injection amount Qd is divided using the division ratio K.

Dither Control Process

In the embodiment, the injection amount correction request value $\alpha$ is calculated based on the rotational speed NE and the load factor KL. However, embodiments are not limited to such a configuration. For example, the injection amount correction request value $\alpha$ may be calculated by multiplying a value that is variably set up to a basic value $\alpha$0, which is an upper limit, depending on the water temperature THW by a correction coefficient that is variably set based on the rotational speed NE and the load factor KL.

With three parameters, namely, the rotational speed NE, the load factor KL, and the water temperature THW, the injection amount correction request value $\alpha$ may be variably set based on only the rotational speed NE and the water temperature THW or based on only the load factor KL and the water temperature THW. The injection amount correction request value $\alpha$ may also be variably set based on one of the three parameters, that is, the rotational speed NE, the load factor KL, and the water temperature THW. Instead of specifying an operating point of the internal combustion engine 10 based on, for example, the rotational speed NE and the load factor KL acting as a load, the operating point of the internal combustion engine 10 may be specified based on, for example, the rotational speed NE and an operation amount of an accelerator acting as a load. The injection amount correction request value $\alpha$ may be variably set based on the intake air amount Ga instead of the rotational speed NE and the load.

It is not necessary to variably set the injection amount correction request value $\alpha$ to a value greater than zero based on the operating point of an internal combustion engine. For example, the injection amount correction request value $\alpha$ may be fixed to a single value that is used for a warm-up process of the three-way catalyst 24 and is greater than zero.

In the embodiment described above, the number of lean combustion cylinders is greater than that of rich combustion cylinders. However, embodiments are not limited to such a configuration. For example, the number of rich combustion cylinders may be equal to that of lean combustion cylinders. Moreover, it is not required that all the cylinders #1 to #4 are set as lean combustion cylinders or rich combustion cylinders. For example, the air-fuel ratio of a cylinder may be the target air-fuel ratio. It is not required that the total injection amount during a combustion cycle when the requested injection amount Qd remains the same is equal to that when dither control is not performed. For example, in the case of four cylinders as described above in the embodiment, the total injection amount of five strokes when the requested injection amount Qd remains the same may be equal to the total injection amount of five strokes when the dither control is not performed. The total injection amount of three strokes when the requested injection amount Qd remains the same may also be equal to the total injection amount of three strokes when the dither control is not performed. However, it is desirable that the period during which both the rich combustion cylinder and the lean combustion cylinder are present in a combustion cycle occur at least one or more times in two combustion cycles. In other words, when the total injection amount is set to be equal to that when the dither control is not performed if the requested injection amount Qd remains the same during a predetermined period, it is desirable that the predetermined period be shorter than or equal to two combustion cycles. For example, when the predetermined period is two combustion cycles and the rich combustion cylinder is present only once in these two combustion cycles, the order of appearance of the rich combustion cylinder and the lean combustion cylinder is "R, L, L, L, L, L, L, L" where R denotes the rich combustion cylinder and L denotes the lean combustion cylinder. In this case, the order "R, L, L, L" appears in a period of one combustion cycle, which is shorter than the predetermined period, in which some of the cylinders #1 to #4 are a rich combustion cylinder and the remaining cylinders are a lean combustion cylinder. When the total injection amount during a period different from a combustion cycle is equal to that when the dither control is not performed, it is desirable that the amount of air that temporarily flows into the internal combustion engine on an intake stroke and flows back to the intake passage before the intake valve is closed may be neglected.

Exhaust Gas Purification Device

In the configuration described above, the three-way catalyst 24 is exemplified as an exhaust gas purification device. However, embodiments are not limited to such a configuration. A gasoline particulate filter (GPF) may be disposed at the downstream side of the three-way catalyst 24. The exhaust gas purification device may be constituted by only the GPF. In this case, it is desirable that the GPF be capable of storing oxygen for the purpose of enhancing the temperature increase effect of dither control.

Exhaust Temperature Increase Request

A temperature increase request is not limited to that described in the above embodiment. For example, as described in the section titled "Exhaust Gas Purification Device," when the internal combustion engine 10 includes a GPF, "request to increase temperature of exhaust" may be a request to increase the temperature of the GPF for the purpose of burning particulate matter collected by the GPF. When the GPF is disposed at the downstream side of the three-way catalyst 24, unburned fuel discharged from a rich combustion cylinder and oxygen discharged from a lean combustion cylinder react in the three-way catalyst 24 and the heat of reaction increases the temperature of exhaust at the downstream side of the three-way catalyst 24 so that the temperature of the GPF is increased, accordingly. Alternatively, a request to increase the temperature of exhaust may be made during dither control to increase the temperature of the exhaust passage 22 for the purpose of preventing collection of condensed water on the exhaust passage 22.

Controller

The controller is not limited to that including the CPU 32 and the ROM 34 and executing software processes. For example, the controller may include a dedicated hardware circuit (for example, an ASIC) that executes at least some of the software processes performed in the embodiment. That is, the controller may have any of the following configurations (a) to (c). Configuration (a) includes a processing device that executes all of the processes described above based on programs and a program storage device that stores the programs such as a ROM. Configuration (b) includes a processing device that executes some of the processes based on programs, a program storage device, and a dedicated hardware circuit that executes the remaining processes. Configuration (c) includes a dedicated hardware circuit that executes all of the processes described above. One or more software circuits including the processing device and the program storage device and one or more dedicated hardware circuits may be provided. That is, it is only required that the processes be executed by processing circuitry that includes at least one of one or more software circuits and one or more dedicated hardware circuits. The program storage device, that is, a computer readable medium, includes any available media accessible by general-purpose or dedicated computers.

Internal Combustion Engine

The internal combustion engine is not limited to a four-cylinder internal combustion engine. For example, a straight six-cylinder internal combustion engine may be used. Alternatively, an internal combustion engine may be a V-type internal combustion engine or may be an engine that has a first exhaust gas purification device and a second exhaust gas purification device. The first exhaust gas purification device and the second exhaust gas purification device may purify exhaust discharged from different cylinders.

Others

The fuel injection valve is not limited to that injecting fuel into the combustion chamber 16, and for example, a fuel injection valve that injects fuel into the intake passage 12 may be used. The internal combustion engine 10 may include, for example, a direct injection valve that is a fuel injection valve for injecting fuel into the combustion chamber 16 and a port injection valve that is a fuel injection valve for injecting fuel into the intake passage 12. It is not necessary to execute air-fuel ratio feedback control during dither control. The purpose of cyclically changing a rich combustion cylinder is not limited to that described in the embodiment.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, the internal combustion engine including an exhaust gas purification device configured to purify exhaust discharged from a plurality of cylinders and a plurality of fuel injection valves respectively provided for the cylinders, wherein
the controller comprises processing circuitry configured to perform
a dither control process that operates the fuel injection valves so as to set one or more of the cylinders as a rich combustion cylinder having an air-fuel ratio richer than a stoichiometric air-fuel ratio and another one or more of the cylinders as a lean combustion cylinder having an air-fuel ratio leaner than the stoichiometric air-fuel ratio, and
a multi-injection process that controls the fuel injection valves so as to allow each of the fuel injection valves to inject fuel multiple times in a combustion cycle of a corresponding one of the cylinders,
multiple injections in the multi-injection process include at least a first injection and a second injection performed at a timing retarded from the first injection,
the dither control process includes a process that changes the cylinders that are set as the rich combustion cylinder and the lean combustion cylinder, and
the dither control process performed during the multi-injection process includes at least one of a process performed on the cylinder changed from the rich combustion cylinder to the lean combustion cylinder so that a reduction amount of fuel injected through the first injection is greater than a reduction amount of fuel injected through the second injection, and a process performed on the cylinder changed from the lean combustion cylinder to the rich combustion cylinder so that an increase amount of fuel injected through the first injection is greater than an increase amount of fuel injected through the second injection.

2. The controller for an internal combustion engine according to claim 1, wherein the processing circuitry is configured to perform a requested injection amount calculation process that calculates a requested injection amount based on an amount of air filling a combustion chamber, the dither control process includes a process that performs increase correction on the requested injection amount using an increase correction rate to calculate an injection amount of the rich combustion cylinder and performs reduction correction on the requested injection amount using a reduction correction rate to calculate an injection amount of the lean combustion cylinder, and a process that sets one or more of the cylinders to the rich combustion cylinder and another one or more of the cylinders to the lean combustion cylinder in a first period, the first period is included in a second period, a total increase correction rate is a value obtained by adding up a value of the increase correction rate used for calculating the injection amount of the rich combustion cylinder in the second period a number of times that the increase correction rate is used in the second period, a total reduction correction rate is a value obtained by adding up a value of the reduction correction rate used for calculating the injection amount of the lean combustion cylinder in the second period a number of times that the reduction correction rate is used in the second period, and the dither control process further includes a process that sets the increase correction rate and the reduction correction rate so that the total increase correction rate is equal to the total reduction correction rate.

3. The controller for an internal combustion engine according to claim 1, wherein the processing circuitry is configured to perform a requested injection amount calculation process that calculates a requested injection amount based on an amount of air filling a combustion chamber, the multi-injection process is a process that divides the requested injection amount to supply the requested injection amount of fuel to each cylinder through multiple injections, wherein the requested injection amount is divided into at least a first requested injection amount for the first injection and a second requested injection amount for the second injection, and the dither control process performed during the multi-injection process includes a process that performs increase correction on the first and second requested injection amounts using an increase correction rate to calculate an injection amount of the rich combustion cylinder, a process that performs reduction correction on the first and second requested injection amounts using a reduction correction rate to calculate an injection amount of the lean combustion cylinder, a process that sets an increase correction rate applied to the second requested injection amount to be smaller than an increase correction rate applied to the first requested injection amount for the rich combustion cylinder, and a process that sets a reduction correction rate applied to the second requested injection, amount to be smaller than a reduction correction rate applied to the first requested injection amount for the lean combustion cylinder.

4. The controller for an internal combustion engine according to claim 3, wherein the dither control process includes a process that sets the increase correction rate applied to the second requested injection amount for the rich combustion cylinder and the reduction correction rate applied to the second requested injection amount for the lean combustion cylinder to zero on condition that the multi-injection process performs the first injection on an intake stroke and the second injection on a compression stroke.

5. A method for controlling an internal combustion engine, the internal combustion engine including an exhaust gas purification device configured to purify exhaust discharged from a plurality of cylinders and a plurality of fuel injection valves respectively provided for the cylinders, the method comprising:

performing a dither control process that operates the fuel injection valves so as to set one or more of the cylinders as a rich combustion cylinder having an air-fuel ratio richer than a stoichiometric air-fuel ratio and another one or more of the cylinders as a lean combustion cylinder having an air-fuel ratio leaner than the stoichiometric air-fuel ratio; and performing a multi-injection process that controls the fuel injection valves so as to allow each of the fuel injection valves to inject fuel multiple times in a combustion cycle of a corresponding one of the cylinders, wherein multiple injections in the multi-injection process include at least a first injection and a second injection performed at a timing retarded from the first injection, the dither control process includes a process that changes the cylinders that are set as the rich combustion cylinder and the lean combustion cylinder, and the dither control process performed during, the multi-injection process includes at least one of a process performed on the cylinder changed from the rich combustion cylinder to the lean combustion cylinder so that a reduction amount of fuel injected through the first injection is greater than a reduction amount of fuel injected through the second injection, and a process performed on the cylinder changed from the lean combustion cylinder to the rich combustion cylinder so that an increase amount of fuel injected through the first injection is greater than an increase amount of fuel injected through the second injection.

\* \* \* \* \*